(12) United States Patent
Kubo

(10) Patent No.: US 6,370,332 B1
(45) Date of Patent: Apr. 9, 2002

(54) ZOOM LENS APPARATUS

(75) Inventor: Kenichi Kubo, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/588,421

(22) Filed: Jun. 6, 2000

(30) Foreign Application Priority Data

Jun. 9, 1999 (JP) .......................................... 11-162661

(51) Int. Cl.$^7$ ........................ G03B 17/00; G02B 15/14; H04N 5/225
(52) U.S. Cl. ............................ 396/77; 396/80; 396/82; 396/86; 359/698; 359/697; 348/358
(58) Field of Search .............................. 396/72, 77, 78, 396/79, 80, 81, 82, 85, 86; 348/358; 359/697, 698

(56) References Cited

U.S. PATENT DOCUMENTS 5,448,413 A * 9/1995 Kobayashi et al. ........... 396/82
6,134,390 A * 10/2000 Kasuya ........................ 396/77

* cited by examiner

Primary Examiner—David M. Gray
Assistant Examiner—Rochelle Blackman
(74) Attorney, Agent, or Firm—Morgan & Finnegan, L.L.P.

(57) ABSTRACT

The present invention relates to a zoom lens having a controller which controls driving of a zoom portion, based on input of zoom control information, and which controls driving of the zoom portion while calculating a target drive state (zoom position) of the zoom portion in order to effect correction for variation in an angle of view with driving of a focus portion. In the present invention the lens of this type is constructed to determine whether the input of the zoom control information is information about the target drive state of the zoom portion (for example, whether the zoom control information is information about the zoom drive state of the zoom portion or information about driving speed of the zoom portion). When the zoom control information is the information about the target drive state, the driving control of the zoom portion for the angle-of-view variation correction is inhibited even with driving of the focus portion, whereby with photographer's intentional zoom manipulation a zoom state according to the zoom manipulation is achieved, taking precedence over the angle-of-view correction.

33 Claims, 7 Drawing Sheets

ZOOM LENS APPARATUS

BACKGROUND OF THE INVENTION

1. Field of the Invention

The present invention relates to a zoom lens used in TV cameras and the like.

2. Related Background Art

The photographic angle of view can be increased or decreased by controlling a zoom portion of a zoom lens to move the lens position, but, with control being effected on a focus portion, the angle of view will also vary similarly because of movement of the lens position. This means that even after a desired angle of view is set by the zoom portion, the angle of view thus set varies with the control on the focus portion. For overcoming it, suggestions have been made heretofore about zoom lenses having the so-called angle-of-view variation correction function of controlling the zoom portion against the variation in the angle of view on the occasion of the control of the focus portion.

SUMMARY OF THE INVENTION

One aspect of the application is to provide a lens apparatus comprising control means which controls driving of a zoom portion, based on input of zoom control information, and which calculates a target drive state of the zoom portion for correction for variation in an angle of view due to driving of a focus portion to control the driving of the zoom portion, wherein the control means determines whether the zoom control information is information about the target drive state of the zoom portion (for example, whether the zoom control information is information about the target drive state of the zoom portion or information about driving speed of the zoom portion) and wherein the control means inhibits control of the driving of the zoom portion for the correction for variation in the angle of view even with the driving of the focus portion when the zoom control information is the information about the target drive state.

One aspect of the application is to provide a lens apparatus wherein the control of the driving of the zoom portion for the correction for variation in the angle of view by the control means is permitted only when the zoom control information is not the information about the target drive state of the zoom portion (for example, when the zoom control information is the information about driving speed of the zoom portion).

The other objects of the present invention will become more apparent from the embodiments which will be described hereinafter with reference to the drawings.

DESCRIPTION OF THE PREFERRED EMBODIMENTS (First Embodiment)

Figure 1:
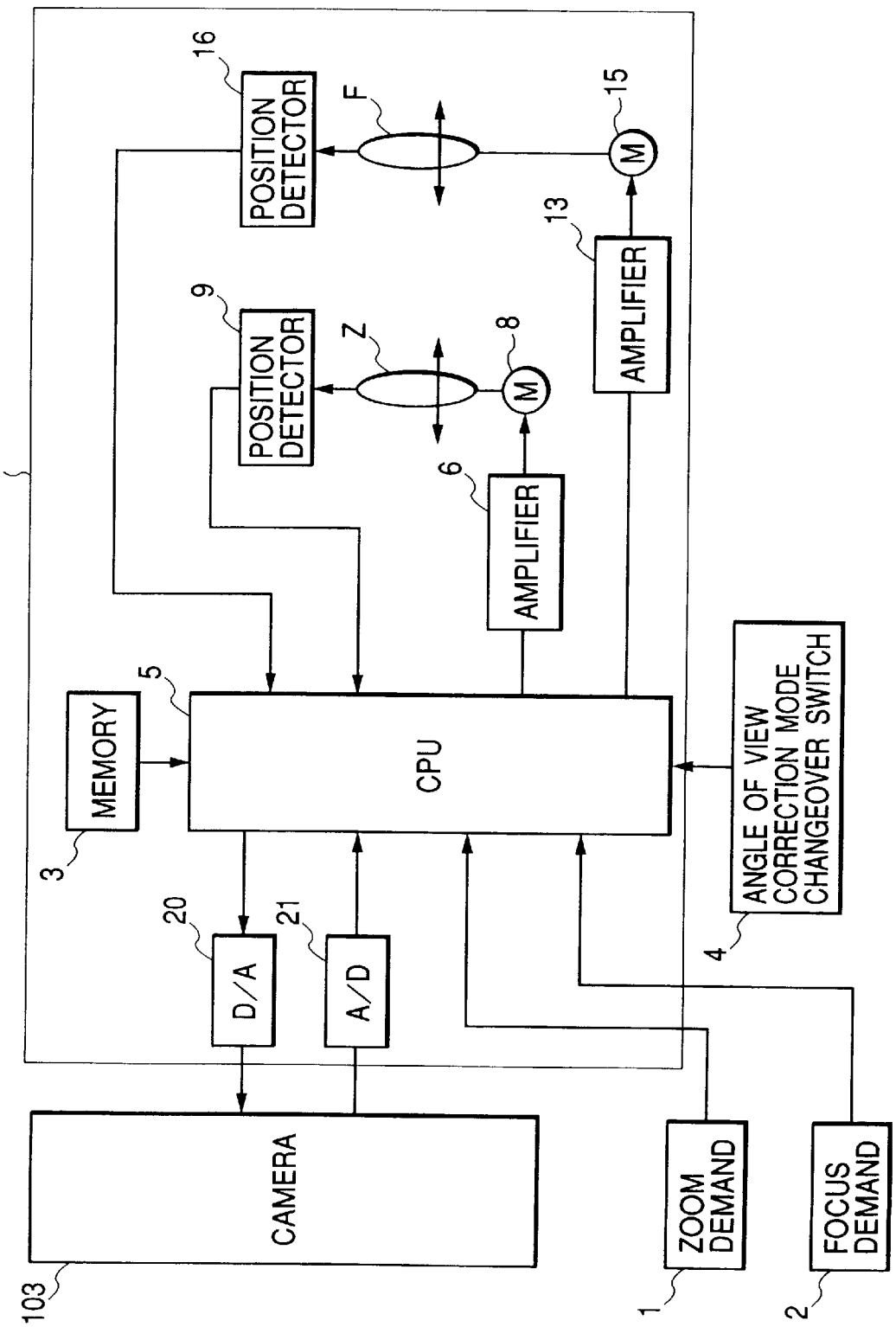
FIG. 1 is a structural diagram of the zoom lens which is the first embodiment of the present invention.

FIG. 1 shows the structure of the zoom lens which is the first embodiment of the present invention. This zoom lens 101 is equipped with a zoom demand (manipulating device) 1 and a focus demand 2 to compose a zoom lens system and is connected in a communicable state to a camera 103 to compose a camera system.

Reference numeral 5 designates a CPU (control means) and the zoom demand 1 and focus demand 2 are connected to this CPU 5. Either zoom position data or zoom speed data as zoom control data (zoom control information) corresponding to the manipulating angle of the zoom demand 1 is selected at the zoom demand 1 and the thus selected data is outputted from the zoom demand 1 to the CPU 5. The CPU 5 also accepts input of focus position data as focus control data corresponding to a manipulation amount of the focus demand 2 therefrom.

One output of the CPU 5 is connected via an amplifier 6 to a motor 8 which actuates a lens constituting a zoom portion Z. The zoom portion Z is provided with a position detector 9 which indicates a count value according to an absolute position of the lens. This position detector 9 is connected to the CPU 5.

Another output of the CPU 5 is connected via an amplifier 13 to a motor 15 which actuates a lens constituting a focus portion F. The focus portion F is provided with a position detector 16 which indicates a count value according to an absolute position of the lens. This position detector 16 is connected to the CPU 5.

Another output of the CPU 5 is connected via a D/A converter 20 to the television camera 103. This enables transmission of follow signals indicating various states of the zoom lens 101, including zoom follow data which represents the lens position of the zoom portion Z, iris follow data which represents a state of an unrepresented stop, and so on, to the camera 103.

An angle-of-view correction mode changeover switch 4 for on/off changeover of the angle-of-view correction function (angle-of-view correction mode) is connected to the CPU 5.

Further, a nonvolatile memory 3, which stores data for determining the relation between positions of the lenses respectively constituting the zoom portion Z and the focus portion F (which will be referred hereinafter as zoom position and focus position) and angles of view, is also connected to the CPU 5. The data stored in the memory 3 will be described below in brief.

A lens drive range from the wide-angle extreme to the telephoto extreme of the zoom portion Z is divided into an arbitrary number n of segments, a lens drive range from the infinite extreme to the nearest extreme of the focus portion F is also divided similarly into an arbitrary number m of segments, and output data of pulse-counting counters in the position detectors 9 and 16 is preliminarily calculated in correspondence thereto. The angle of view at the ith zoom divisional point and at the jth focus divisional point is determined by optical computing and, similarly, the angle of view at the ith zoom divisional point and at the (j+1)th focus divisional point, that at the (i+1)th zoom divisional point and at the jth focus divisional point, and that at the (i+1)th zoom divisional point and at the (j+1)th focus divisional point are also determined by optical computing. A relation among the zoom position, focus position, and angle of view in a region surrounded by these four points is approximated by an equation of a plane including three points out of the four points. By applying this equation of the approximate plane, the angle of view can be represented by the function of Eq. (1) below with variables of zoom position and focus position.

$$\omega = Cz \times Pz + Cf \times Pf + D \qquad (1)$$

In this equation ω indicates the magnitude of angle of view, Cz a coefficient for the zoom position of the approximate plane, Pz the zoom position, Cf a coefficient for the focus position of the approximate plane, Pf the focus position, and D a constant term of the approximate plane. The memory 3 stores data of a map of the coefficients Cz, Cf, and D determined in this way.

Figure 2:
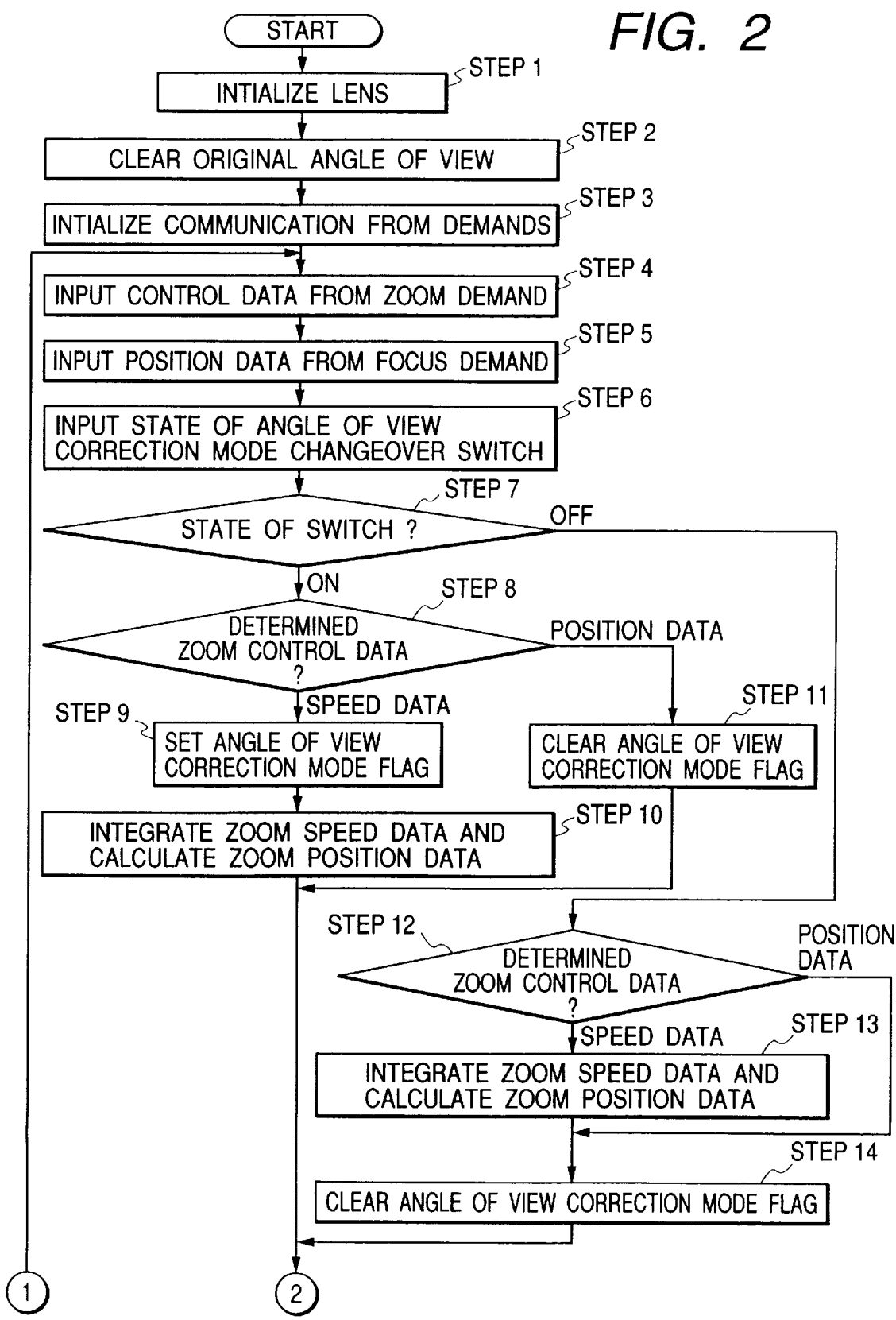
FIG. 2 is a flowchart to show the operation of the above-stated zoom lens.
Figure 3:
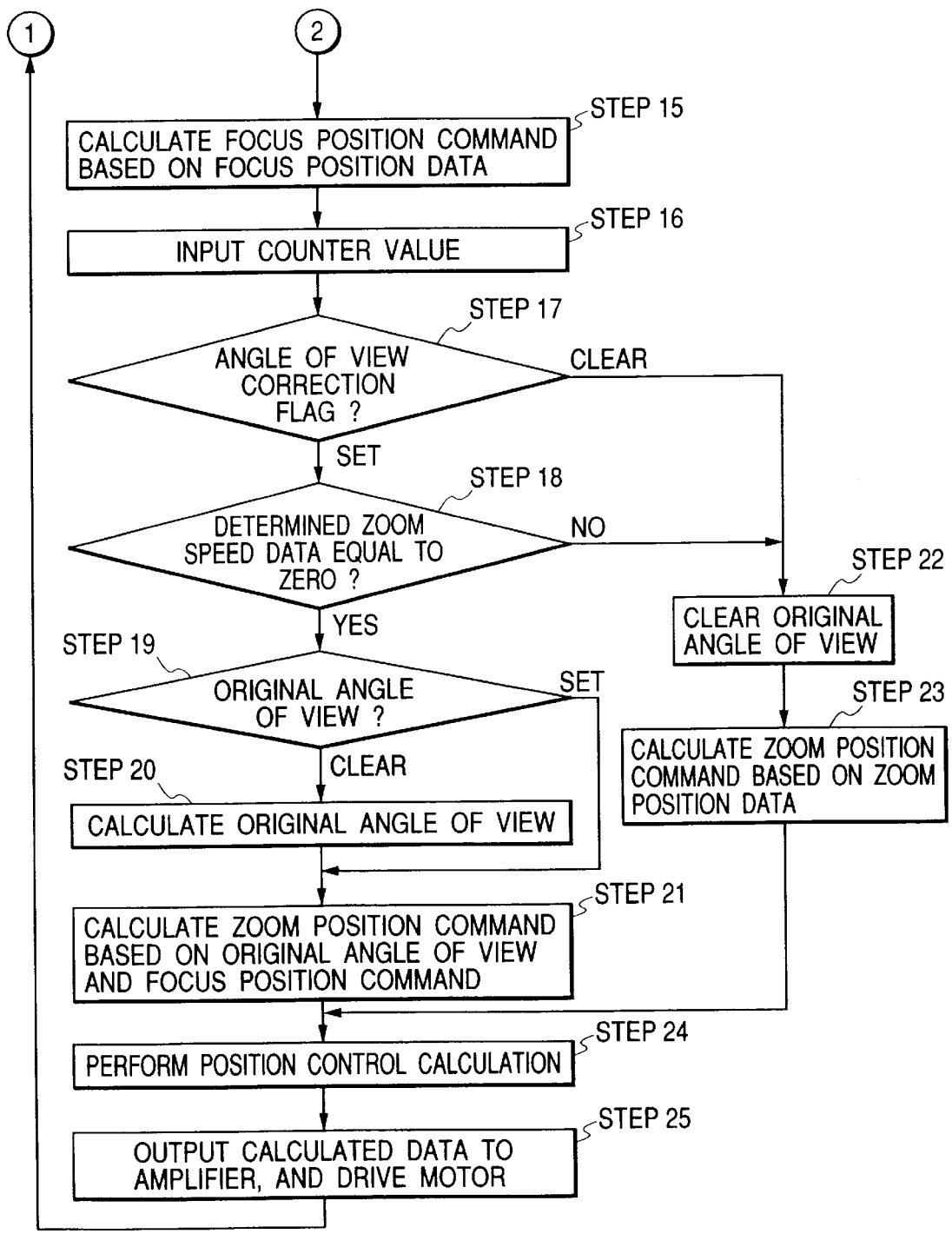
FIG. 3 is a flowchart to show the operation of the above-stated zoom lens.

The flowchart of FIG. 2 and FIG. 3 shows the sequential operation from immediately after power is turned on in the zoom lens. In these figures, the portions denoted by identical encircled numerals indicate mutual connection thereat.

Immediately after power is turned on, the CPU 5 proceeds to step 1 to initialize the interior of the CPU 5. The CPU also initializes the lens constituting the zoom portion Z and the lens constituting the focus portion F, using outputs from the position detectors 9 and 16.

Then the CPU 5 clears the original angle of view ωorg in step 2 and then goes to step 3 to initialize the serial communication with the zoom demand 1 and with the focus demand 2. The initialization operation is complete herein and then the CPU transfers to the normal operation to control the zoom portion Z and the focus portion F in accordance with the outputs from the zoom demand 1 and from the focus demand 2.

The CPU 5 accepts input of normalized zoom control data Zvalue from the zoom demand 1 in step 4 and also accepts input of normalized focus control data (focus position data) Fdata from the focus demand 2 in step 5. Further, the CPU 5 also accepts input of the state of the angle-of-view correction mode changeover switch 4 in step 6.

Next, the CPU determines the state of the angle-of-view correction mode changeover switch 4 in step 7. When this switch 4 is on, the CPU goes to step 8 to determine the zoom control data Zvalue. When the zoom control data Zvalue is speed data Zspeed, the CPU goes to step 9 to set an angle-of-view correction mode flag. Further, in step 10 the CPU integrates the speed data Zspeed by use of Eq. (2) below to calculate zoom position data Zdata. After that, the CPU proceeds to step 15.

$$Zdata = Zbuf + K \times Zspeed \qquad (2)$$

Zbuf: zoom position data upon preceding sampling
K: arbitrary integration constant On the other hand, when in step 8 the zoom control data Zvalue is position data Zdata, the CPU goes to step 11 to clear the angle-of-view correction mode flag and then goes to step 15.

When the angle-of-view correction mode changeover switch 4 is off in step 7, the CPU proceeds to step 12 to determine the zoom control data Zvalue. When it is the speed data Zspeed, the CPU moves to step 13 to integrate the zoom speed data Zspeed by use of above Eq. (2) to calculate the zoom position data Zdata, and then proceeds to step 14.

On the other hand, when in step 12 the zoom control data Zvalue is the position data Zdata, the CPU jumps to step 14. In step 14 the CPU clears the angle-of-view correction mode flag and then moves to step 15.

In step 15 the CPU substitutes the focus position data Fdata into Eq. (3) below to calculate a focus position command Focus corresponding to the output of the counter in the position detector 16.

$$Focus = Far + Fdata/NOM \times (Near - Far) \qquad (3)$$

Far: infinite-extreme focus command position
Near: nearest-extreme focus command position
NOM: maximum of normalized focus position data Then the CPU moves to step 16 to set the output of the counter in the position detector 9, in a counter buffer Zfol and also sets the output of the counter in the position detector 16, in a counter buffer Ffol.

Next, in step 17 the CPU determines the angle-of-view correction mode flag. When the angle-of-view correction mode flag is set, the CPU goes to step 18 to determine the zoom speed data Zspeed. When the zoom speed data Zspeed is 0 (i.e., with a command to stop the zoom portion Z), the CPU proceeds to step 19 to determine whether the original angle of view ωorg is set.

When the original angle of view ωorg is cleared in step 19, the CPU goes to step 20 to read the coefficients of the approximate plane equation corresponding to the region including the counter buffers Zfol and Ffol out of the memory 3 and substitute the read coefficients and the values of the counter buffers into Eq. (1) to calculate the original angle of view ωorg. Then the CPU goes to step 21. When the original angle of view ωorg is set in step 19, the CPU jumps to step 21.

In step 21, the CPU reads the coefficients of the approximate plane equation corresponding to the region including the counter buffer Zfol and the focus position command Focus out of the memory 3 and substitutes the read coefficients Cz', Cf', D, the original angle of view ωorg, and the focus position command Focus into Eq. (4) below to calculate a zoom position command Zoom corresponding to the output of the counter in the position detector 9. Then the CPU goes to step 24.

$$Zoom = (\omega org - Cf' \times Focus - D)/Cz' \qquad (4)$$

On the other hand, when in step 18 the zoom speed data Zspeed is not equal to 0 (i.e., with a command to actuate the zoom portion Z) or when in step 17 the angle-of-view correction mode flag is cleared, the CPU jumps to step 22 to clear the original angle of view ωorg. Further, the CPU goes to step 23 to substitute the zoom position data Zdata into Eq. (5) below to calculate the zoom position command Zoom corresponding to the output of the counter in the position detector 16, and then goes to step 24.

$$Zoom = Wide + Zdata/NOM \times (Tele - Wide) \qquad (5)$$

Wide: wide-angle-extreme zoom position command
Tele: telephoto-extreme zoom position command
NOM: maximum of normalized zoom position data After the zoom position command Zoom is calculated in this way, the CPU goes to step 24 to perform position control calculation of the zoom portion Z using this zoom position command Zoom and the counter buffer Zfol and also perform position control calculation of the focus portion F using the focus position command Focus and the counter buffer Ffol.

In step 25 the CPU then outputs the result of the position control calculation of the zoom portion Z acquired in step 24 to the amplifier 6 to actuate the motor 8. The CPU also outputs the result of the position control calculation of the focus portion F to the amplifier 13 to actuate the motor 15.

After that, the CPU repeatedly carries out the operation from step 4 to step 25 before power becomes off.

In the present embodiment, as described above, with the angle-of-view correction mode changeover switch 4 being on (i.e., when the angle-of-view correction mode is on) (step 7), the zoom position command for the angle-of-view variation correction is calculated only when the zoom control data supplied from the zoom demand 1 is the zoom speed data (step 8) and when the zoom speed data is equal to 0 (step 18). For this reason, when the focus position data is supplied from the focus demand 2 with the zoom speed data of 0 being supplied from the zoom demand 1, the zoom portion Z is also driven so as to keep the angle of view constant with driving of the focus portion F.

On the other hand, when the zoom control data supplied from the zoom demand 1 is the zoom position data with the angle-of-view correction mode changeover switch 4 being on, the angle-of-view correction mode flag is cleared (step 11) and the zoom position command is calculated based on the above zoom position data (step 23), without execution of the calculation of the zoom position command for the angle-of-view variation correction.

(Second Embodiment)

Figure 4:
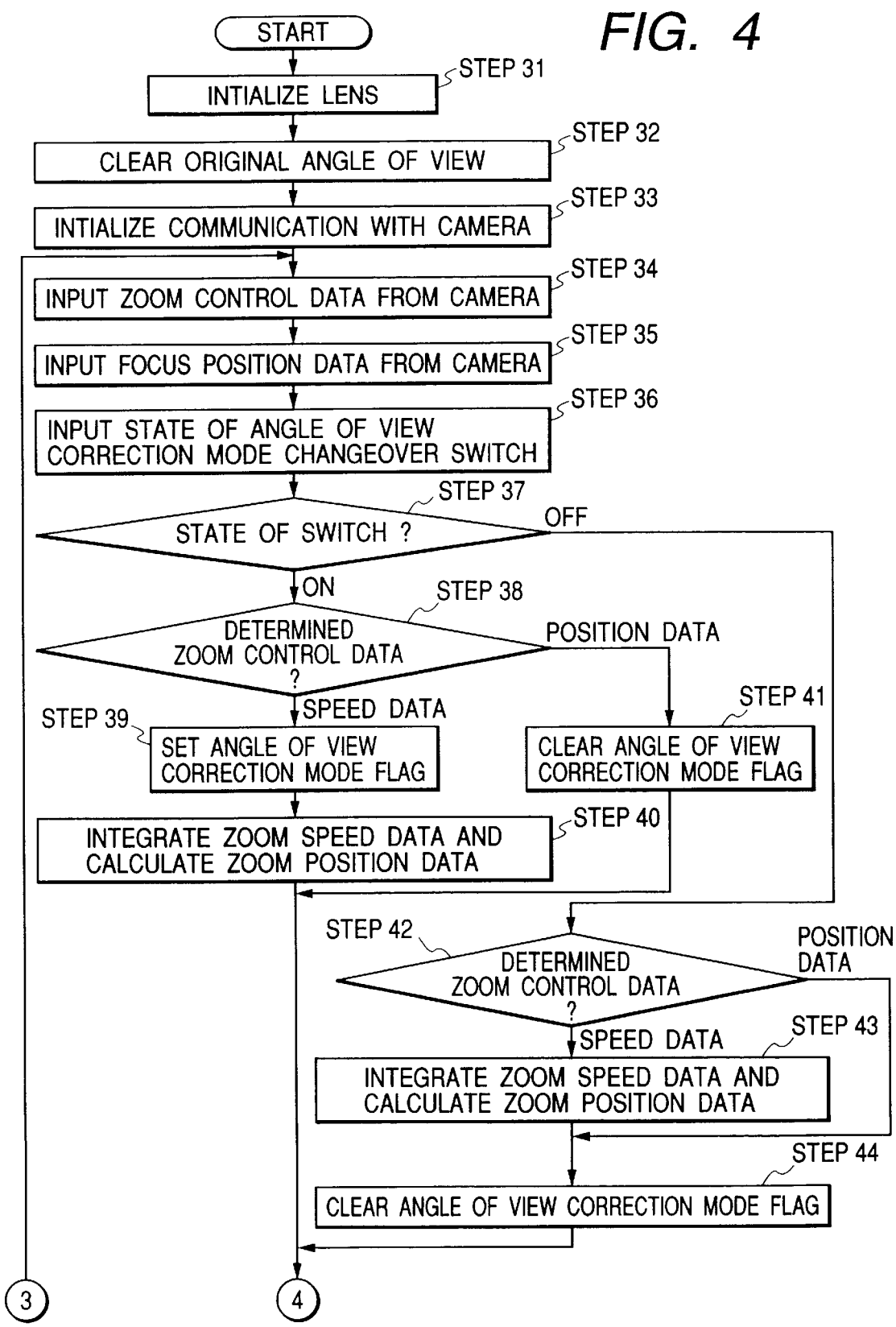
FIG. 4 is a flowchart to show the operation of the zoom lens which is the second embodiment of the present invention.
Figure 5:
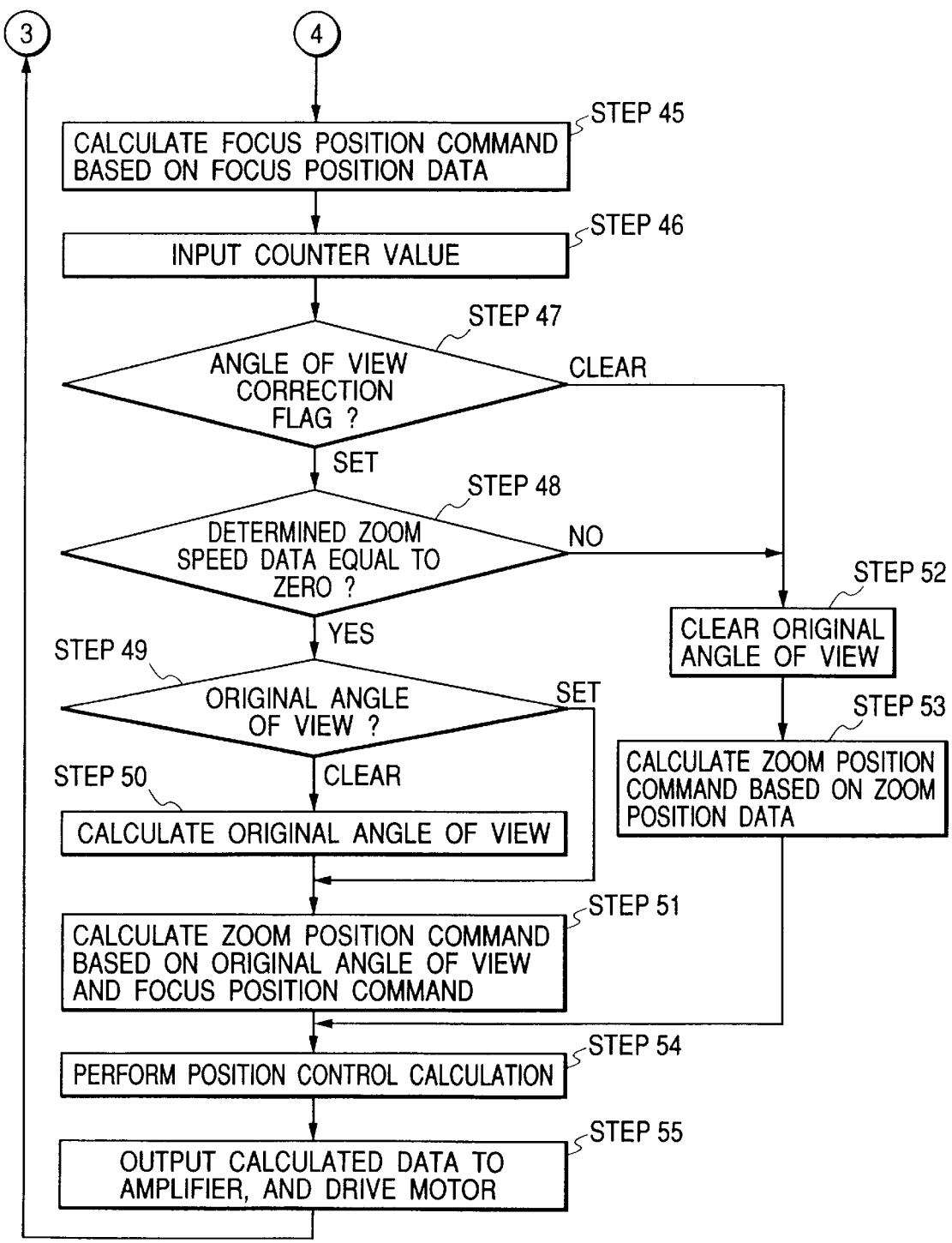
FIG. 5 is a flowchart to show the operation of the zoom lens of the second embodiment.

The flowchart of FIG. 4 and FIG. 5 shows the sequential operation from immediately after on of power in the zoom lens which is the second embodiment of the present invention. In these figures the portions denoted by identical encircled numerals indicate mutual connection thereat.

The first embodiment was described as to the case in which the zoom control data and the focus control data was supplied from the zoom demand 1 and from the focus demand 2, respectively, but the present embodiment will be described as to a case in which the zoom control data and the focus control data is supplied from the camera connected in the communicable state to the zoom lens.

The present embodiment is applied to camera systems including the zoom lens of structure similar to the zoom lens illustrated in FIG. 1. Therefore, common components will be denoted by the same reference symbols as in the first embodiment. It is, however, noted that the two demands 1, 2 do not always have to be connected to the zoom lens 101 in the present embodiment.

A communication terminal of the camera 103 is connected via an A/D converter 21 to the CPU 5 of the zoom lens 101 of FIG. 1, and the zoom control data and the focus control data is entered from the camera 103 through the A/D converter 21 into the zoom lens 101 (CPU 5). The camera selectively outputs either speed or position data as the zoom control data.

Immediately after on of power, the CPU 5 goes to step 31 to initialize the interior of the CPU 5. The CPU 5 also initializes the lens constituting the zoom portion Z and the lens constituting the focus portion F, using the outputs from the position detectors 9 and 16.

Next, the CPU clears the original angle of view $\omega$org in step 32 and initializes the serial communication with the camera 103 in step 33. The initialization operation is complete herein and then the CPU transfers to the normal operation to control the zoom portion Z and the focus portion F in accordance with the output from the camera 103.

The CPU accepts input of normalized zoom control data Zvalue from the camera 103 in step 34 and also accepts input of normalized focus control data (focus position data) Fdata from the camera 103 in step 35. Further, the CPU accepts input of the state of the angle-of-view correction mode changeover switch 4 in step 36.

Next in step 37 the CPU determines the state of the angle-of-view correction mode changeover switch 4. When this switch 4 is on, the CPU goes to step 38 to determine the zoom control data Zvalue. When the zoom control data Zvalue is the speed data Zspeed, the CPU goes to step 39 to set the angle-of-view correction mode flag. Further, the CPU goes to step 40 to integrate the speed data Zspeed by use of Eq. (2), which was described in the first embodiment, to calculate the zoom position data Zdata. After that, the CPU goes to step 45.

On the other hand, when in step 38 the zoom control data Zvalue is the position data Zdata, the CPU moves to step 41 to clear the angle-of-view correction mode flag, and then goes to step 45.

When in step 37 the angle-of-view correction mode changeover switch 4 is off, the CPU moves to step 42 to determine the zoom control data Zvalue. When it is the speed data Zspeed, the CPU goes to step 43 to integrate the zoom speed data Zspeed by use of above Eq. (2) to calculate the zoom position data Zdata, and then goes to step 44.

On the other hand, when in step 42 the zoom control data Zvalue is the position data Zdata, the CPU jumps to step 44. The CPU clears the angle-of-view correction mode flag in step 44 and then proceeds to step 45.

In step 45 the CPU substitutes the focus position data Fdata into Eq. (3), which was described in the first embodiment, to calculate the focus position command Focus corresponding to the output of the counter in the position detector 16.

Then the CPU proceeds to step 46 to set the output of the counter in the position detector 9, in the counter buffer Zfol and sets the output of the counter in the position detector 16, in the counter buffer Ffol.

Next, the CPU goes to step 47 to determine the angle-of-view correction mode flag. When the angle-of-view correction mode flag is set, the CPU goes to step 48 to determine the zoom speed data Zspeed. When the zoom speed data Zspeed is 0 (i.e., with a command to stop the zoom portion Z), the CPU goes to step 49 to determine whether the original angle of view $\omega$org is set.

When the original angle of view $\omega$org is cleared in step 49, the CPU reads the coefficients of the approximate plane equation corresponding to the region including the counter buffers Zfol and Ffol out of the memory 3 and substitutes the read coefficients and the values of the counter buffers into Eq. (1), which was described in the first embodiment, to calculate the original angle of view $\omega$org in step 50. Then the CPU goes to step 51. When the original angle of view $\omega$org is set in step 49, the CPU jumps to step 51.

In step 51, the CPU reads the coefficients of the approximate plane equation corresponding to the region including the counter buffer Zfol and the focus position command Focus out of the memory 3 and substitutes the read coefficients Cz', Cf, D, the original angle of view $\omega$org, and the focus position command Focus into Eq. (4), which was described in the first embodiment, to calculate the zoom position command Zoom corresponding to the output of the counter in the position detector 9. Then the CPU goes to step 54.

On the other hand, when in step 48 the zoom speed data Zspeed is not equal to 0 (i.e., with a command to actuate the zoom portion Z) or when in step 47 the angle-of-view correction mode flag is cleared, the CPU jumps to step 52 to clear the original angle of view $\omega$org. Further, the CPU goes to step 53 to substitute the zoom position data Zdata into Eq. (5), which was described in the first embodiment, to calculate the zoom position command Zoom corresponding to the output of the counter in the position detector 16, and then goes to step 54.

After the zoom position command Zoom is calculated in this way, the CPU goes to step 54 to perform the position control calculation of the zoom portion Z using this zoom position command Zoom and the counter buffer Zfol and also perform the position control calculation of the focus portion F using the focus position command Focus and the counter buffer Ffol.

Then the CPU goes to step 55 to output the result of the position control calculation of the zoom portion Z acquired in step 54 to the amplifier 6 to actuate the motor 8. The CPU also outputs the result of the position control calculation of the focus portion F to the amplifier 13 to actuate the motor 15.

After that, the CPU repeatedly carries out the operation from step 34 to step 55 before power becomes off.

In the present embodiment, as described above, with the angle-of-view correction mode changeover switch 4 being on (i.e., when the angle-of-view correction mode is on) (step 37), the zoom position command for the angle-of-view variation correction is calculated and the driving control of the zoom portion Z is permitted only when the zoom control data supplied from the camera 103 is the zoom speed data (step 38) and when the zoom speed data is equal to 0 (step 48). For this reason, when the focus position data is supplied from the camera 103 with the zoom speed data of 0 being supplied from the camera 103, the zoom portion Z is also driven so as to keep the angle of view constant with driving of the focus portion F.

On the other hand, when the zoom control data supplied from the camera 103 is the zoom position data with the angle-of-view correction mode changeover switch 4 being on, the angle-of-view correction mode flag is cleared (step 41) and the zoom position command is calculated based on the above zoom position data (step 53), without execution of the calculation of the zoom position command for the angle-of-view variation correction. Namely, the driving control of the zoom portion Z for the angle-of-view variation correction is inhibited.

(Third Embodiment)

Figure 6:
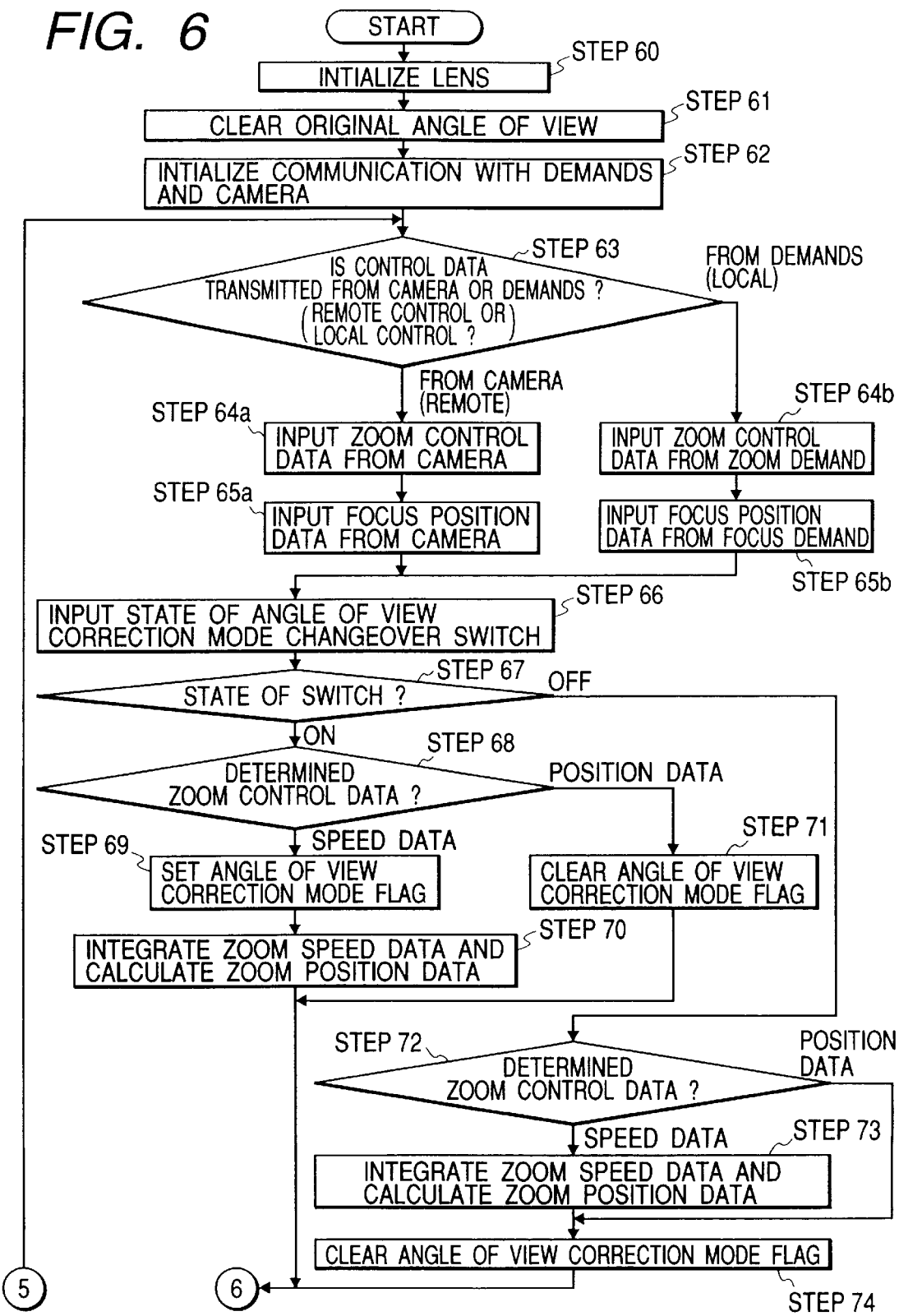
FIG. 6 is a flowchart to show the operation of the zoom lens which is the third embodiment of the present invention.
Figure 7:
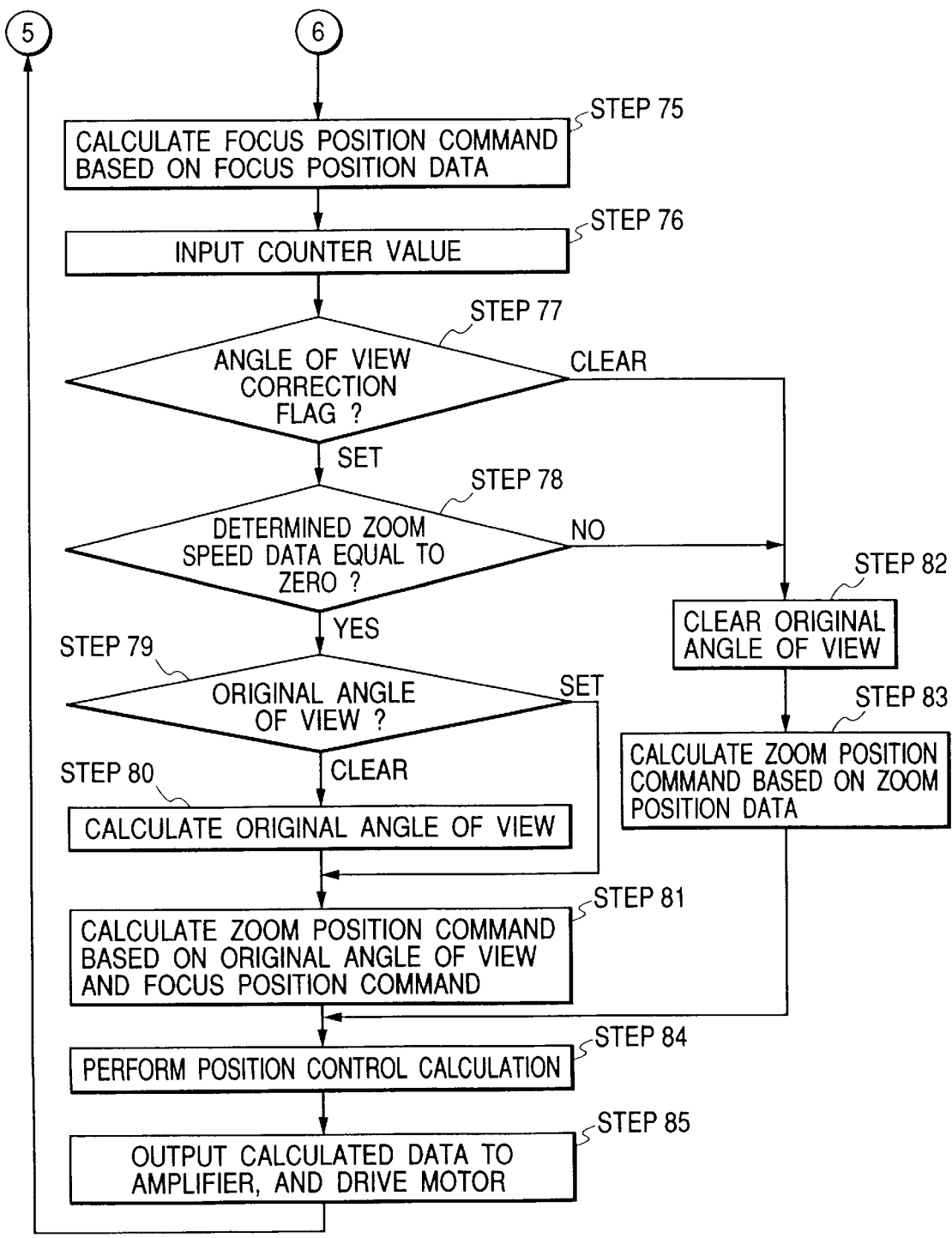
FIG. 7 is a flowchart to show the operation of the zoom lens of the third embodiment.

The flowchart of FIG. 6 and FIG. 7 shows the sequential operation from immediately after on of power in the zoom lens which is the third embodiment of the present invention. In these figures the portions denoted by identical encircled numerals indicate mutual connection thereat.

Each of the first and second embodiments was described as to the case in which the zoom control data and focus control data was supplied from either of the demands 1, 2 and the camera 103, whereas the present embodiment will be described as to a case in which the zoom control data and focus control data is supplied from the both of the demands 1, 2 and the camera 103.

The present embodiment is applied to camera systems including the zoom lens of structure similar to the zoom lens illustrated in FIG. 1, and the demands 1, 2. Therefore, the common components will be denoted by the same reference symbols as in the first embodiment.

The communication terminal of the camera 103 is connected via the A/D converter 21 to the CPU 5 of the zoom lens 101, as also described in the second embodiment, and the zoom control data and the focus control data is entered from the camera 103 via the A/D converter 21 into the zoom lens 101 (CPU 5). The zoom control data and the focus control data is also supplied from the zoom demand 1 and from the focus demand 2 to the zoom lens 101 (CPU 5), as described in the first embodiment.

Immediately after on of power, the CPU 5 moves to step 60 to initialize the interior of the CPU 5. The CPU also initializes the lens constituting the zoom portion Z and the lens constituting the focus portion F, using the outputs from the position detectors 9, 16.

Next, the CPU clears the original angle of view $\omega$org in step 61 and then initializes the serial communication with the zoom demand 1, with the focus demand 2, and with the camera 103 in step 62. The initialization operation is complete herein and then the CPU transfers to the normal operation to control the zoom portion Z and the focus portion F in accordance with the output from the zoom demand 1, from the focus demand 2, or from the camera 103.

First, in step 63 the CPU determines whether the control data is received from the camera 103 (remote) or from the demands 1, 2 (local).

In the remote case, the CPU accepts input of the normalized zoom control data Zvalue and the normalized focus control data (focus position data) Fdata from the camera 103 in steps 64a, 65a. On the other hand, in the local case the CPU accepts input of the normalized zoom control data Zvalue and the normalized focus control data Fdata from the respective demands 1, 2 in steps 64b, 65b.

Further, the CPU accepts input of the state of the angle-of-view correction mode changeover switch 4 in step 66.

Next, the CPU goes to step 67 to determine the state of the angle-of-view correction mode changeover switch 4. When this switch 4 is on, the CPU goes to step 68 to determine the zoom control data Zvalue. When the zoom control data Zvalue is the speed data Zspeed, the CPU goes to step 69 to set the angle-of-view correction mode flag. Further, the CPU goes to step 70 to integrate the speed data Zspeed by use of Eq. (2), which was described in the first embodiment, to calculate the zoom position data Zdata. After that, the CPU proceeds to step 75.

On the other hand, when in step 68 the zoom control data Zvalue is the position data Zdata, the CPU goes to step 71 to clear the angle-of-view correction mode flag, and then moves to step 75.

When in step 67 the angle-of-view correction mode changeover switch 4 is off, the CPU goes to step 72 to determine the zoom control data Zvalue. When it is the speed data Zspeed, the CPU goes to step 73 to integrate the zoom speed data Zspeed by use of above Eq. (2) to calculate the zoom position data Zdata, and then goes to step 74.

On the other hand, when in step 72 the zoom control data Zvalue is the position data Zdata, the CPU jumps to step 74. The CPU clears the angle-of-view correction mode flag in step 74 and then goes to step 75.

In step 75, the CPU substitutes the focus position data Fdata into Eq. (3), which was described in the first embodiment, to calculate the focus position command Focus corresponding to the output of the counter in the position detector 16.

Then the CPU goes to step 76 to set the output of the counter in the position detector 9, in the counter buffer Zfol and also sets the output of the counter in the position detector 16, in the counter buffer Ffol.

Next, the CPU goes to step 77 to determine the angle-of-view correction mode flag. When the angle-of-view correction mode flag is set, the CPU goes to step 78 to determine the zoom speed data Zspeed. When the zoom speed data Zspeed is 0 (i.e., with a command to stop the zoom portion Z), the CPU proceeds to step 79 to determine whether the original angle of view $\omega$org is set.

When the original angle of view $\omega$org is cleared in step 79, the CPU reads the coefficients of the approximate plane equation corresponding to the region including the counter buffers Zfol and Ffol out of the memory 3 and substitutes the read coefficients and the values of the counter buffers into Eq. (1), which was described in the first embodiment, to calculate the original angle of view ωorg in step 80. Then the CPU goes to step 81. When the original angle of view ωorg is set in step 79, the CPU jumps to step 81.

In step 81 the CPU reads the coefficients of the approximate plane equation corresponding to the region including the counter buffer Zfol and the focus position command Focus out of the memory 3 and then substitutes the read coefficients Cz', Cf, D, the original angle of view ωorg, and the focus position command Focus into Eq. (4), which was described in the first embodiment, to calculate the zoom position command Zoom corresponding to the output of the counter in the position detector 9. Then the CPU goes to step 84.

On the other hand, when in step 78 the zoom speed data Zspeed is not equal to 0 (i.e., with a command to actuate the zoom portion Z) or when in step 77 the angle-of-view correction mode flag is cleared, the CPU jumps to step 82 to clear the original angle of view ωorg. Further, the CPU goes to step 83 to substitute the zoom position data Zdata into Eq. (5) described in the first embodiment, to calculate the zoom position command Zoom corresponding to the output of the counter in the position detector 16, and then goes to step 84.

After the zoom position command Zoom is calculated in this way, the CPU goes to step 84 to perform the position control calculation of the zoom portion Z using the zoom position command Zoom and the counter buffer Zfol and also perform the position control calculation of the focus portion F using the focus position command Focus and the counter buffer Ffol.

Then the CPU goes to step 85 to output the result of the position control calculation of the zoom portion Z acquired in step 84 to the amplifier 6 to actuate the motor 8. The CPU also outputs the result of the position control calculation of the focus portion F to the amplifier 13 to actuate the motor 15.

After that, the CPU repeatedly carries out the operation from step 63 to step 85 before power becomes off.

In the present embodiment, as described above, with the angle-of-view correction mode changeover switch 4 being on (i.e., when the angle-of-view correction mode is on) (step 67), the zoom position command for the angle-of-view variation correction is calculated only when the zoom control data supplied from the zoom demand 1 or from the camera 103 is the zoom speed data (step 68) and when the zoom speed data is equal to 0 (step 78). For this reason, when the focus position data is supplied from the focus demand 2 or from the camera 103 with the zoom speed data of 0 being supplied from the zoom demand 1 or from the camera 103, the zoom portion Z is also driven so as to keep the angle of view constant with driving of the focus portion F.

On the other hand, when the zoom control data supplied from the zoom demand 1 or from the camera 103 is the zoom position data with the angle-of-view correction mode changeover switch 4 being on, the angle-of-view correction mode flag is cleared (step 71) and the zoom position command is calculated based on the above zoom position data (step 83), without execution of the calculation of the zoom position command for the angle-of-view variation correction.

What is claimed is:

1. A zoom lens apparatus comprising:
    a correction means for performing an angle-of-view correction function for variation in an angle-of-view associated with a driving of a focus portion;
    a determining means which determines whether a received zoom information is information about a zoom position; and
    a control means which inhibits the angle-of-view correction function when the determining means determines that the zoom information received is information about the zoom position.

2. The zoom lens apparatus according to claim 1, further comprising a driving means for driving a zoom portion, based on the zoom information, when said determining means determines that the zoom information is information about the zoom position.

3. The zoom lens apparatus according to claim 1, wherein said control means activates said angle of view correction function when said determining means determines that the zoom information is information about speed and when said speed is a predetermined speed.

4. The zoom lens apparatus according to claim 3, wherein said predetermined speed is zero.

5. A zoom lens apparatus comprising:
    a correction means for performing an angle-of-view correction function for variation in an angle-of-view associated with a driving of a focus portion;
    a determining means which determines whether a received zoom information is information about a zoom speed; and
    a permitting means which permits the angle-of-view correction function when the determining means determines that the zoom information received is information about the zoom speed.

6. The zoom lens apparatus according to claim 5, further comprising a driving means for driving a zoom portion, based on the zoom information, when said determining means determines that the zoom information is information about a zoom position.

7. The zoom lens apparatus according to claim 5, further comprising a control means for activating said angle of view correction function when said determining means determines that the zoom information is information about speed and when said speed is a predetermined speed.

8. The zoom lens apparatus according to claim 7, wherein said predetermined speed is zero.

9. A zoom lens apparatus comprising:
    a correction means for performing an angle-of-view correction function for variation in an angle-of-view associated with a driving of a focus portion;
    a determining means which determines whether a received zoom information is information about a zoom position or information about a zoom speed; and
    a control means which inhibits the angle-of-view correction function when the determining means determines that the zoom information received is information about the zoom position.

10. The zoom lens apparatus according to claim 9, further comprising a driving means for driving a zoom portion, based on the zoom information, when said determining means determines that the zoom information is information about the zoom position.

11. The zoom lens apparatus according to claim 9, further comprising a control means for activating said angle of view correction function when said determining means determines that the zoom information is information about speed and when said speed is a predetermined speed.

12. The zoom lens apparatus according to claim 11, wherein said predetermined speed is zero.

13. A zoom lens apparatus comprising:
a correction means for performing an angle-of-view correction function for variation in an angle-of-view associated with a driving of a focus portion;
a determining means which determines whether a received zoom information is information about a zoom position or information about a zoom speed; and
a permitting means which permits the angle-of-view correction function when the determining means determines that the zoom information received is information about the zoom speed.

14. The zoom lens apparatus according to claim 13, further comprising a driving means for driving a zoom portion, based on the zoom information, when said determining means determines that the zoom information is information about the zoom position.

15. The zoom lens apparatus according to claim 13, further comprising a control means for activating said angle of view correction function when said determining means determines that the zoom information is information about speed and when said speed is a predetermined speed.

16. The zoom lens apparatus according to claim 15, wherein said predetermined speed is zero.

17. A zoom lens apparatus comprising:
a correction means for performing an angle-of-view correction function for variation in an angle-of-view associated with a driving of a focus portion;
a setting means for selectively setting said correction means in a first state for inhibiting the angle-of-view correction function or in a second state for permitting the angle of view correction function;
a determining means which determines whether a received zoom information is information about a zoom position or information about a zoom speed; and
a setting control means for controlling said setting means in said first state when the determining means determines that the zoom information received is information about the zoom position, and for controlling said setting means in said second state when the determining means determines that the received zoom information is information about the zoom speed.

18. The zoom lens apparatus according to claim 17, further comprising a driving means for driving a zoom portion, based on the zoom information, when said determining means determines that the zoom information is information about the zoom position.

19. A zoom lens control system including a device for outputting zoom information and a zoom lens apparatus for receiving the outputted zoom information for driving a zoom portion, based on the outputted zoom information received, said zoom lens control system comprising:
a correction means for performing an angle-of-view correction function for variation in an angle-of-view associated with a driving of a focus portion; and
a control means which inhibits the angle-of-view correction function when an outputted zoom information is received.

20. A zoom lens control system including a device for outputting zoom information and a zoom lens apparatus for receiving the outputted zoom information for driving a zoom portion, based on the outputted zoom information received, said zoom control system comprising:
a correction means for performing an angle-of-view correction function for variation in an angle-of-view associated with a driving of a focus portion;
a determining means which determines whether an outputted zoom information is information about a zoom position; and
a control means which inhibits the angle-of-view correction function when the determining means determines that the outputted zoom information received is information about the zoom position.

21. The zoom lens control system according to claim 20, further comprising a driving means for driving a zoom portion, based on the zoom information, when said determining means determines that the zoom information is information about the zoom position.

22. The zoom lens control system according to claim 20, wherein said control means activates said angle of view correction function when said determining means determines that the zoom information is information about speed and when said speed is a predetermined speed.

23. A zoom lens control system including a device for outputting zoom information and a zoom lens apparatus for receiving the outputted zoom information for driving a zoom portion, based on the outputted zoom information received, said zoom control system comprising:
a correction means for performing an angle-of-view correction function for variation in an angle-of-view associated with a driving of a focus portion;
a determining means which determines whether an outputted zoom information is information about a zoom position or a zoom speed; and
a permitting means which permits the angle-of-view correction function when the determining means determines that the outputted zoom information received is not information about the zoom position.

24. The zoom lens control system according to claim 23, further comprising a driving means for driving a zoom portion, based on the zoom information, when said determining means determines that the zoom information is information about the zoom position.

25. The zoom lens control system according to claim 23, further comprising a control means for activating said angle of view correction function when said determining means determines that the zoom information is information about speed and when said speed is a predetermined speed.

26. A zoom lens control system including a device for outputting zoom information and a zoom apparatus for receiving the outputted zoom information for driving a zoom portion, based on the outputted zoom information received, said zoom lens control system comprising:
a correction means for performing an angle-of-view correction function for variation in an angle-of-view associated with a driving of a focus portion;
a determining means which determines whether an outputted zoom information is information about a zoom position or information about a zoom speed; and
a control means which inhibits the angle-of-view correction function when the determining means determines that the outputted zoom information received is information about the zoom position.

27. The zoom lens control system according to claim 26, further comprising a driving means for driving a zoom portion, based on the zoom information, when said determining means determines that the zoom information is information about the zoom position.

28. The zoom lens control system according to claim 26, wherein said control means activates said angle of view correction function when said determining means determines that the zoom information is information about speed and when said speed is a predetermined speed.

29. A zoom lens control system including a device for outputting zoom information and a zoom lens apparatus for receiving the outputted zoom information for driving a zoom portion, based on the outputted zoom information received, said zoom lens control system comprising:

a correction means for performing an angle-of-view correction function for variation in an angle-of-view associated with a driving of a focus portion;

a determining means which determines whether an outputted zoom information is information about a zoom position or information about a zoom speed; and a permitting means which permits the angle-of-view correction function when the determining means determines that the outputted zoom information received is information about the zoom speed.

30. The zoom lens control system according to claim 29, further comprising a driving means for driving a zoom portion, based on the zoom information, when said determining means determines that the zoom information is information about the zoom position.

31. The zoom lens control system according to claim 29, further comprising a control means for activating said angle of view correction function when said determining means determines that the zoom information is information about speed and when said speed is a predetermined speed.

32. A zoom lens control system including a device for outputting zoom information and a zoom lens apparatus for receiving the outputted zoom information for driving a zoom portion, based on the outputted zoom information received, said zoom lens control system comprising:

a correction means for performing an angle-of-view correction function for variation in an angle-of-view associated with a driving of a focus portion;

a setting means for selectively setting said correction means in a first state for inhibiting the angle-of-view correction function or in a second state for permitting the angle of view correction function;

a determining means which determines whether an outputted zoom information is information about a zoom position or information about a zoom speed; and a setting control means for controlling said setting means in said first state when the determining means determines that the outputted zoom information received is information about a zoom position and for controlling said setting means in said second state when the determining means determines that the outputted zoom information received is information about the zoom speed.

33. The zoom lens control system according to claim 32, further comprising a driving means for driving a zoom portion, based on the zoom information, when said determining means determines that the zoom information is information about the zoom position.

* * * * *

UNITED STATES PATENT AND TRADEMARK OFFICE
CERTIFICATE OF CORRECTION

PATENT NO. : 6,370,332 B1
DATED : April 9, 2002
INVENTOR(S) : Kenichi Kubo

It is certified that error appears in the above-identified patent and that said Letters Patent is hereby corrected as shown below:

Column 4,
Line 39, Equation 4, "Cf" should read -- Cf' --

Column 12,
Line 44, "zoom apparatus" should read -- zoom lens apparatus --

Signed and Sealed this

Tenth Day of September, 2002

Attest:

JAMES E. ROGAN
Attesting Officer  Director of the United States Patent and Trademark Office